Patented June 2, 1931

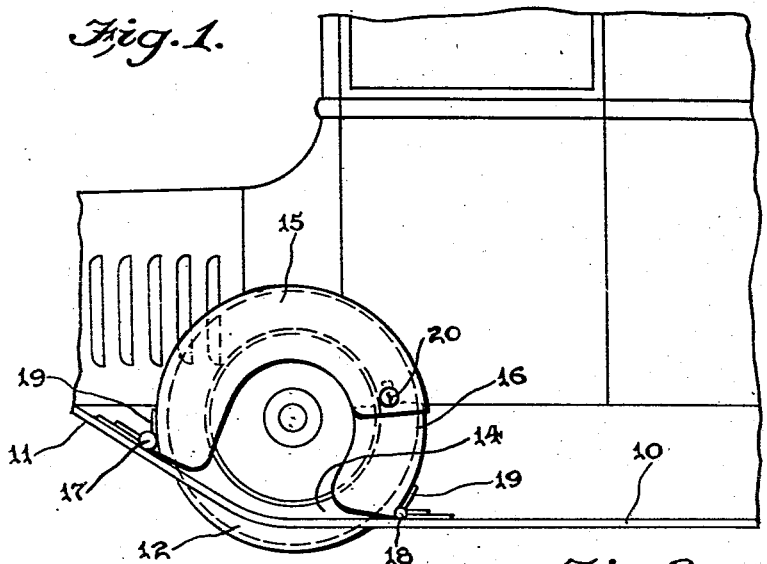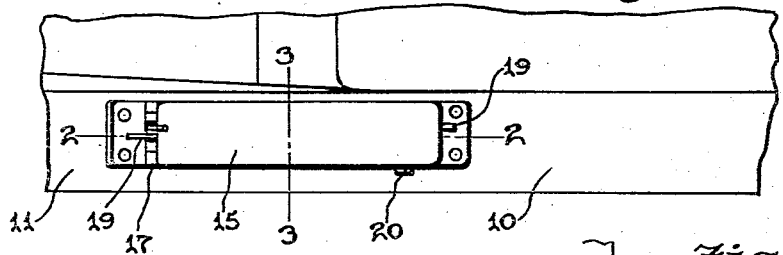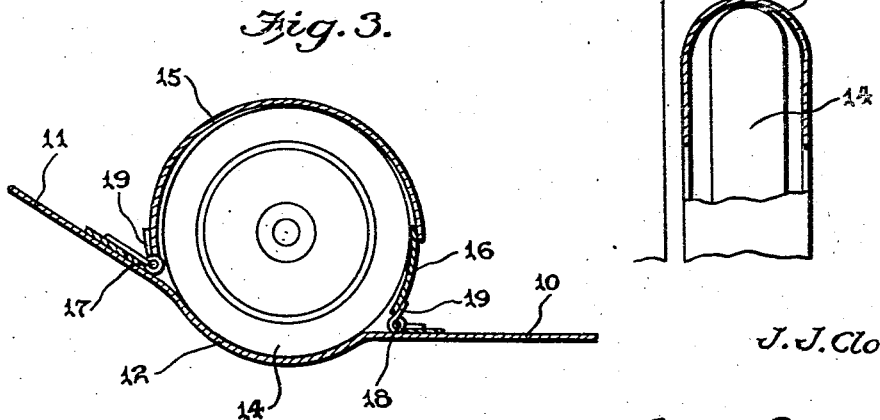

1,808,291

UNITED STATES PATENT OFFICE

JOHN JAMES CLOUGHLEY, OF OKLAHOMA CITY, OKLAHOMA

TIRE COVER

Application filed April 29, 1930. Serial No. 448,259.

The object of the invention is to provide a device to be applied to an auto vehicle as a permanent adjunct thereof so as to serve not only as a protective means for the spare tire whether it be carried on a rim or on an extra wheel, but to serve also as a means for protecting such spare tire and wheel against theft; to provide a construction which will insure against rattling of the tire in the carrier and to provide a device of this character which is of simple construction and susceptible of cheap manufacture and low marketing cost.

With this object in view the invention consists in a construction and combination of parts of which a preferred embodiment is illustrated in the accompanying drawings, wherein:

Figure 1 is a side elevational view of a portion of an auto vehicle showing the invention applied in operative position thereon.

Figure 2 is a top plan view of the invention.

Figures 3 and 4 are sectional views on the planes indicated by the lines 3—3 and 4—4 respectively of Figure 2.

In carrying out the invention, the running-board 10 and adjacent portion of the fender 11 of an auto vehicle are dished as indicated at 12 to provide a seat for the spare tire 14 with its attendant rim or spare wheel.

The cover comprises the sections 15 and 16 and these are hingedly connected, as at 17 and 18 with the fender and running-board respectively, these cover sections conforming cross-sectionally to the cross-sectional contour of the tire and the hinges being provided with springs 19 normally impelling the sections towards the tire or into closed position. The section 15 is of materially greater length than the section 16, so that it extends over top of the spare tire and into overlapping relation with the section 16, being equipped with a lock 20 engaging a keeper on the section 16.

In the illustrated embodiment of the invention the lock is carried by the section 15 but the two sections may obviously be locked by means of a staple and hasp connection and a shackle lock. To remove the tire it is merely necessary to release the lock and swing the sections back from unobstructing position to the spare tire, when the latter and its rim or wheel may be removed from the seat.

The cover sections being spring impelled towards the spare tire when mounted in the seat, engage the latter snugly and prevent any rattling of the parts or any slight movement of the tire in the seat.

The invention having been described what is claimed as new and useful is:

1. In combination with a motor vehicle having its fender and adjacent portion of the running-board dished to provide a seat for a spare tire, cross-sectionally arcuate cover sections hinged to the running board and fender respectively on opposite sides of said seat, and springs impelling said sections toward a tire mounted in said seat.

2. In combination with a motor vehicle having its fender and adjacent portion of the running board dished to provide a seat for a spare tire, cross-sectionally arcuate cover sections hinged to the running board and fender respectively on opposite sides of said seat, and springs impelling said sections toward a tire mounted in said seat, one of said sections being of materially greater length than the other and overlapping the same and having a locking connection therewith.

In testimony whereof he affixes his signature.

JOHN JAMES CLOUGHLEY.